US006546171B2

United States Patent
Fukutomi

(10) Patent No.: US 6,546,171 B2
(45) Date of Patent: Apr. 8, 2003

(54) STRUCTURE FOR SHIELDING STRAY LIGHT IN OPTICAL WAVEGUIDE MODULE

(75) Inventor: Yasuhiro Fukutomi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/840,037

(22) Filed: Apr. 24, 2001

(65) Prior Publication Data
US 2001/0033716 A1 Oct. 25, 2001

(30) Foreign Application Priority Data
Apr. 25, 2000 (JP) ........................................ 2000-123878

(51) Int. Cl.[7] .................................................. G02B 6/30
(52) U.S. Cl. ............................ 385/49; 385/14; 385/129; 385/89
(58) Field of Search ............................... 385/14, 49, 89, 385/129, 39

(56) References Cited

U.S. PATENT DOCUMENTS 6,343,171 B1 * 1/2002 Yoshimura et al. ........... 385/14
2002/0001427 A1 * 1/2002 Hashimoto et al. ........... 385/14
2002/0031307 A1 * 3/2002 Kimura ......................... 385/49
2002/0048431 A1 * 4/2002 Kimura ......................... 385/47
2002/0051607 A1 * 5/2002 Ido et al. ....................... 385/49
2002/0067892 A1 * 6/2002 Oguro ........................... 385/49

FOREIGN PATENT DOCUMENTS

JP          2579092          11/1996

* cited by examiner

Primary Examiner—Rodney Bovernick
Assistant Examiner—Sung Pak
(74) Attorney, Agent, or Firm—McGinn & Gibb, PLLC

(57) ABSTRACT

A structure for shielding a stray light in an optical waveguide module is composed of an optical waveguide substrate supported in an optical waveguide module package, an optical waveguide formed on the optical waveguide substrate, a LD mounted on the optical waveguide substrate, an optical fiber-placement section formed on the optical waveguide substrate, an optical fiber situated on the optical fiber-placement section, a WDM filter formed on the optical waveguide substrate, a PD-mounting carrier situated behind the WDM filter, a PD mounted on the PD-mounting carrier, a metallic layer evaporated on the WDM filter, and a pin hole formed on the metallic layer at nearly a center thereof.

16 Claims, 3 Drawing Sheets

STRUCTURE FOR SHIELDING STRAY LIGHT IN OPTICAL WAVEGUIDE MODULE

FIELD OF THE INVENTION

Figure 1:
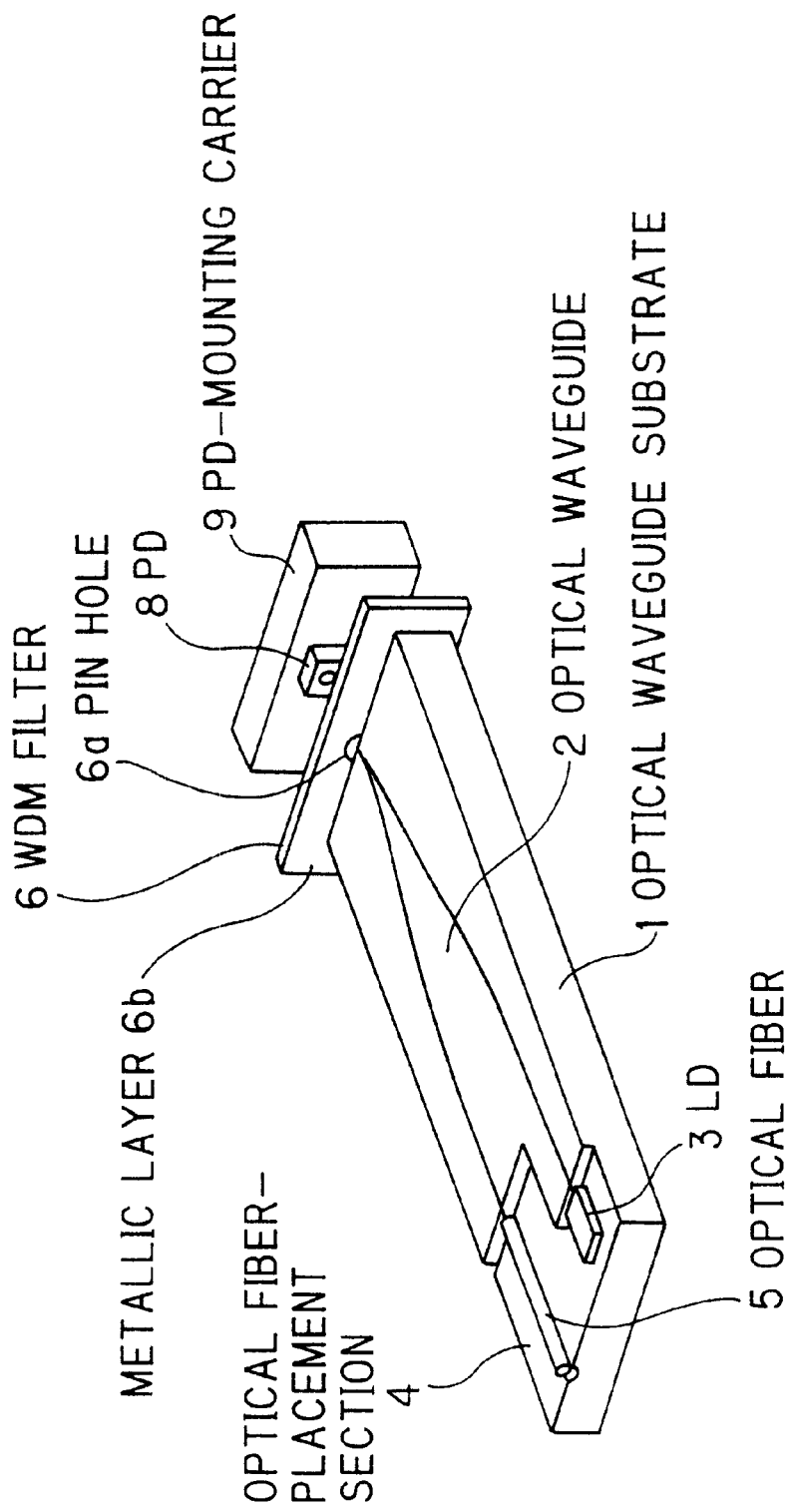

The invention relates to a structure for shielding a stray light in an optical waveguide module, and especially to a structure for shielding a stray light leaked from a laser light to a photodiode for receiving a signal light.

BACKGROUND OF THE INVENTION

Recently, a field of an application of an optical communication is rapidly shifting to a subscriber line from a trunk line. It is the general trend that optical modules used in optical subscriber systems are optical transceivers which have functions of transmitting and receiving signal lights simultaneously on the basis of introduction of the optical waveguides etc. for miniaturization and economization.

In the conventional optical transceiver, a laser diode (LD, hereinafter) for generating the signal light and a photodiode (PD, hereinafter) for receiving the same are integrated with the same optical module. In the optical module in which transmission of the signal light and reception of the same is simultaneously performed, although a part of the signal light emitted from the LD is optically coupled with the optical waveguide, the remaining signal light leaks to the PD as a stray light. The stray light becomes a cause of a noise for the receiving signal light, and threreby a sensitivity in the receiving of the optical module deteriorates.

In the optical module in which transmission of the signal light and reception of the same are alternately performed by the time division multiplexing technology, when the stray light leaking from the LD reaches regions of the PD which are other than a light-receiving surface thereof, since a life time of carriers generated inside the PD is longer than that of the carriers generated on the light-receiving surface of the PD, a noise with a long time constant is caused in the PD and the sensitivity in receiving the signal light deteriorates just after the operation of the optical module is switched to the receiving mode from the transmitting mode.

In the conventional optical module for a bidirectional optical communication disclosed in Japanese Patent No.2579092, a light-shielding member provided with a pin hole is situated just before a PD, and thereby a light of a clad mode (an undesired light) propagating along a clad of a waveguide substrate or a stray light leaked from the semiconductor LD is prevented from being coupled with the PD. By making a light-receiving area of the PD larger than a cross-sectional area of a core of the optical waveguide and an area of the pin hole small in conformity with a cross-sectional dimension of the optical waveguide, the undesired light can be prevent form being couped with the PD.

As mentioned in the above, in the aforementioned conventional optical module, since the transmission path of the stray light leaked from the LD to the PD is complicated because of multiple reflections in a package and the optical waveguide, it is difficult to shield the stray light so as not to be coupled with the PD for receiving the signal light even in case that the pin hole is formed therefor.

SUMMARY OF THE INVENTION

Accordingly, it is an object of the invention to provide a structure for shielding a stray light in an optical waveguide module which a stray light leaked from a LD does not reach a PD for receiving a signal light to prevent a sensitivity in reception of a signal light from being deteriorated.

According to the first feature of the invention, a structure for shielding a stray light in an optical waveguide module comprises:

an optical waveguide substrate supported in an optical waveguide module package, a LD which is mounted on the optical waveguide substrate and emits a first signal light, an optical waveguide which is formed on the optical waveguide substrate and propagates a part of the first signal light, a wavelength division multiplexing (WDM, hereinafter) filter which is formed on the optical waveguide substrate, an optical fiber which is situated on the optical waveguide substrate and transmits the part of the first signal light to an optical transmission line, a PD for receiving a second signal light which is propagated through the optical transmission line and transmitted through the WDM filter via the optical waveguide, and a metallic layer which is evaporated on a surface of the WDM filter and provided with a pin hole for transmitting the second signal light to the PD via the WDM filter, wherein a remaining part of the first signal light (a stray light, hereinafter) which is not optically coupled with the optical waveguide is reflected by the metallic layer so that the stray light is prevented from being coupled with the PD.

It is desirable to provide a light-absorption layer additionally evaporated on the metallic layer.

The light-absorption layer is formed of chromium oxide.

It is desirable that the WDM filter is situated on an end of the optical waveguide substrate.

It is desirable that the LD is situated on the side of the WDM filter.

According to the second feature of the invention, a structure for shielding a stray light in an optical waveguide module comprises:

an optical waveguide substrate supported in an optical waveguide module package, a LD which is mounted on the optical waveguide substrate and emits a first signal light, an optical waveguide which is formed on the optical waveguide substrate and propagates a part of the first signal light, a WDM filter which is formed on the optical waveguide substrate, an optical fiber which is situated on the optical waveguide substrate and transmits the part of the first signal light to an optical transmission line, a photodiode for receiving a second signal light which is propagated through the optical transmission line and transmitted through the WDM filter via the optical waveguide, and a plate which is stuck to a surface of the WDM filter, does not transmit the first and second signal lights but reflect them, and is provided with a pin hole for transmitting the second signal light to the PD via the WDM filter, wherein a remaining part of the first signal light which is not optically coupled with the optical waveguide is reflected by the plate so that the stray light is prevented from being coupled with the PD.

As mentioned in the above, the invention especially relates to a structure for shielding a stray light used in an optical transceiver module using optical waveguides, and features of the invention can be summarized as follows.

(1) A filter on which a metallic layer having a pin hole is evaporated or a plate having a pin hole is stuck is inserted in a light path in a module.

(2) A stray light radiated from a clad of an optical waveguide is prevented from being coupled with a light-receiving device by the pin hole inserted in the light path.

(3) The metallic layer does not transmits the lights applied to the optical communication but reflects them.

(4) A size of the filter is larger than that of an end face of the optical waveguide substrate.

(5) Material forming the plate having the pin hole does not transmits the lights applied to the optical communication but reflect them.

BRIEF DESCRIPTION OF APPENDED DRAWINGS

Figure 2A:
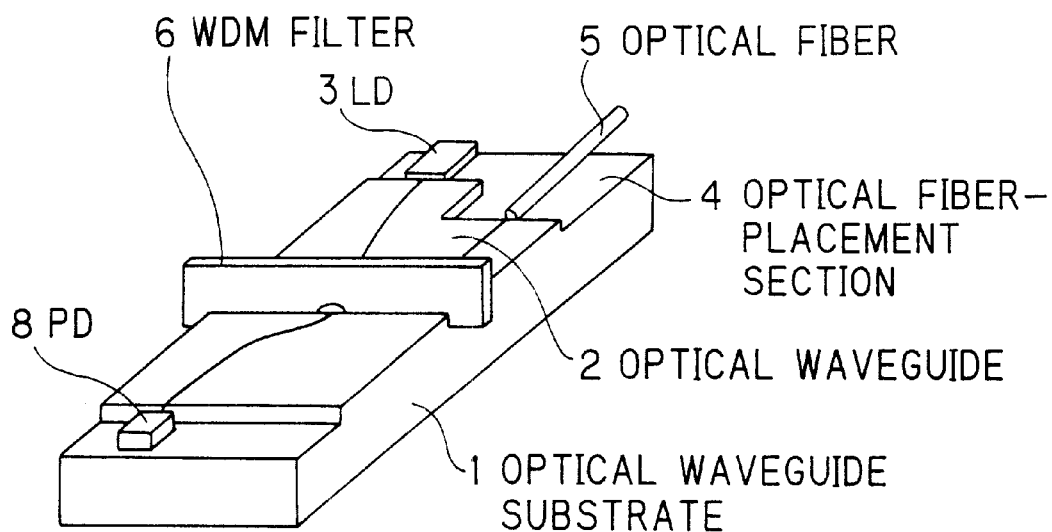
Figure 2B:
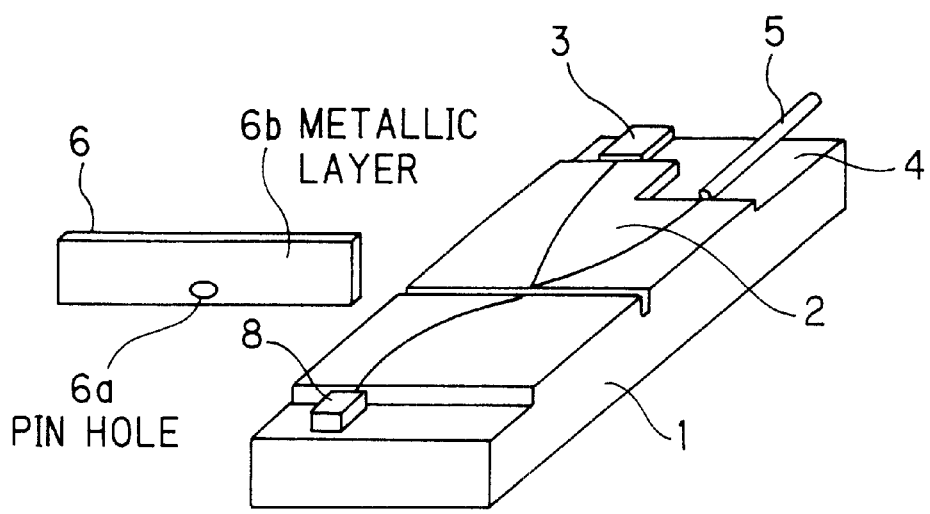
Figure 3:
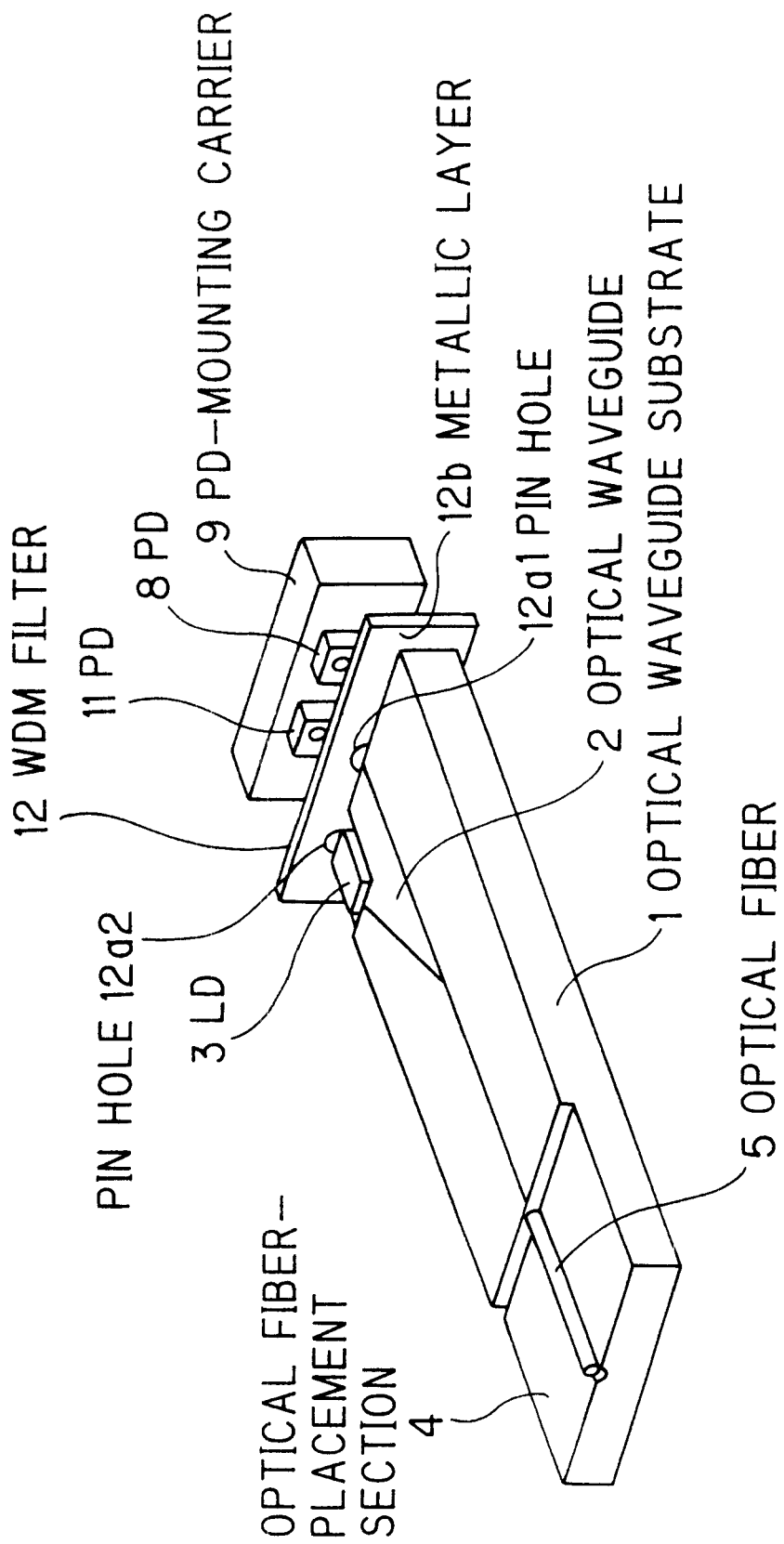

The invention will be explained in more detail in conjunction with appended drawings, wherein:

FIG. 1 is a perspective view for showing the first preferred embodiment of the invention, FIGS. 2A, 2B are perspective views for showing the second preferred embodiment of the invention, wherein FIG. 2A is a perspective view for showing a state that a WDM filter is fitted to an optical waveguide module, and FIG. 2B is a perspective view for showing a state that a WDM filter is removed from an optical waveguide module, and FIG. 3 is a perspective view for showing the third preferred embodiment of the invention.

Next, embodiments of the invention will be explained in detail referring to the appended drawings.

FIG. 1 is a perspective view for showing a structure for shielding a stray light in an optical waveguide module according to the first preferred embodiment of the invention. As shown in FIG. 1, an optical waveguide substrate 1 is provided for a module package, and an optical waveguide 2 is formed thereon. A LD 3 is mounted on the optical waveguide substrate 1, and an optical fiber-placement section 4 is formed on the same. The optical fiber-placement section 4 is provided with an optical fiber 5 which is communicated with an optical transmission line (not shown). A WDM filter 6 which transmits a receiving signal light and reflects a transmitting signal light is stuck to an end face of the optical waveguide substrate 1. A PD 8 for detecting the receiving signal light is mounted on a PD-mounting carrier 9, which is situated behind the WDM filter 6. A metallic layer 6b is evaporated on a front surface of the WDM filter 6, and a pin hole 6a is provided for the metallic layer 6b at a center thereof. The metallic layer 6b does not transmit the signal lights applied to the optical communication but reflects them.

Moreover, a light-absorption layer formed of chromium oxide etc. may be evaporated on the metallic layer 6b additionally.

Stillmore, a plate on which the pin hole is formed may be stuck to the WDM filter 6 instead of evaporating the metallic layer 6b on the WDM filter 6, where the aforementioned plate is formed of material which does not transmit the lights applied to the optical communication but reflects them. The plate may be formed of metal for example.

Next, the embodiments of the invention will be explained in detail referring to the appended drawings.

The first preferred embodiment of the invention will be explained referring to FIG. 1 in the first place. In this embodiment, a part of the signal light emitted from the LD 3 is optically coupled with the optical waveguide 2 and propagated therethrough. The signal light propagated through the optical waveguide 2 is reflected by the WDM filter 6 totally, optically coupled with the optical fiber 5 via the optical waveguide 2, and guided to the optical transmission line (not shown).

Another signal light transmitted through the optical transmission line to the optical waveguide module is optically coupled with the optical waveguide 2 via the optical fiber 5, passes through the WDM filter 6 via the pin hole 6a, and is detected by the PD 8 for receiving the signal light.

In the optical waveguide module in which transmission and reception of the signal lights are performed simultaneously by using the transmitting and receiving signal lights with different wavelengths, although a part of the signal light emitted from the LD 3 is optically coupled with the optical waveguide 2, if the remaining light which is not optically coupled with the optical waveguide 2 leaks to the PD 8 for receiving the signal light supplied from the optical transmission line, it becomes a noise for the receiving signal light and deteriorates the receiving characteristic of the optical waveguide module.

About fifty percent of the signal light emitted from the LD 3 is optically coupled with the optical waveguide 2 in the optimum condition, and the remaining signal light propagates through the air or a clad of the optical waveguide 2 as a stray light. If the stray light passes through the WDM filter 6 and leaks to the PD 8 for receiving the signal light, the receiving characteristic of the optical waveguide module deteriorates. Although the WDM filter 6 shields the light emitted from the LD 3 which is the main component of the stray light, the WDM filter 6 cannot shield the stray light having a large angle of incidence perfectly.

According to the structure of the first preferred embodiment, the stray light which undergoes multiple reflections in the clad and reaches the WDM filter 6 with a large angle of incidence is reflected by the metallic layer 6b evaporated on the WDM filter 6, and is not coupled with the PD 8 for receiving the signal light.

Moreover, since the pin hole 6a is provided for the metallic layer 6b, the receiving signal light can reach the PD 8 straightly.

In case that a chromium oxide layer is evaporated on the metallic layer 6b additionally, since the stray light spreading over the clad is not reflected by the WDM filter 6 but absorbed by the chromium oxide layer, the multiple reflections of the stray light in the clad can be suppressed.

When the WDM filter 6 larger than a cross-section of the optical waveguide substrate 1 is used, the stray light which radiates from the LD 3 to the air without being coupled with the optical waveguide 2 can be prevented from being optically coupled with the PD 8 surely.

Next, the second preferred embodiment of the invention will be explained in detail referring to FIG. 2.

FIGS. 2A, 2B are perspective view for showing the second preferred embodiment of the invention. In this embodiment, the PD 8 for receiving the signal light is mounted on the optical waveguide substrate 1. FIG. 2A is a perspective view for showing a state that the WDM filter 6 is fitted to the optical waveguide substrate 1, and FIG. 2B is a perspective view for showing a state that the WDM filter 6 is removed from the same. In this embodiment, a part of the signal light emitted from the LD 3 is optically coupled with the optical waveguide 2 and propagates therethrough. The signal light having propagated through the optical waveguide 2 is reflected by the WDM filter 6 totally, optically coupled with the optical fiber 5 via the optical waveguide 2, and propagates through the optical transmission line.

The receiving signal light having propagated through the optical transmission line is optically coupled with the optical waveguide 2 via the optical fiber 5, successively passes through the WDM filter 6 and the pin hole 6a formed on the metallic layer 6b, propagates through the optical waveguide 2, and detected by the PD 8 for receiving the signal light.

Since the metallic layer 6b is evaporated on the WDM filter 6, the stray light which is emitted from the LD 3 and reaches the WDM filter 6 with a large angle of incidence is reflected by the metallic layer 6b and never coupled with the PD 8. As a result, the pending problem that the receiving characteristic is deteriorated in the optical waveguide module in which transmission and reception of the optical signals are simultaneously performed can be settled.

Next, the third preferred embodiment of the invention will be explained in detail referring to FIG. 3.

FIG. 3 is a perspective view for showing the third preferred embodiment of the invention. In this embodiment, transmission and reception of the signal lights are alternately performed by the time division multiplexing technology, and the wavelengths of the transmitting and receiving signal lights are the same. A part of the signal light emitted from the LD 3 is optically coupled with the optical waveguide 2, propagated therethrough, and transmitted to the optical transmission line via the optical fiber 5. On the other hand, the receiving signal light having propagated through the optical transmission line is optically coupled with the optical waveguide 2 via the optical fiber 5, passes through a WDM filter 12 via a pin hole 12a1 formed on a metallic layer 12b, and is detected by the PD 8 for receiving the signal light, where the metallic layer 12b is evaporated on the WDM filter 12. A backward light emitted from a reverse surface of the LD 3 passes through the WDM filter 12 via a pin hole 12a2 formed on the metallic layer 12b, and is coupled with a PD 11 for monitoring the backward light. In the third preferred embodiment of the invention, the stray light which is emitted from the LD 3 and fails to optically couple with the optical waveguide 2 is reflected by the metallic layer 12b, hence the stray light incident on regions of the PD 8 which are other than the light receiving surface thereof is reduced. Accordingly, the pending problem that the receiving characteristic of the optical waveguide module deteriorates just after the operation thereof is switched to the receiving mode from the transmission mode because of a noise with a long time constant can be settled.

As mentioned in the above, the stray light which does not couple with the optical waveguide and spreads over the clad can be prevented from coupling with the PD for receiving the signal light according to the invention. Accordingly, even in the optical waveguide module in which transmission and reception of the signal lights are simultaneously performed, since the transmitting light does not leak to the PD for receiving the signal light, the pending problem that the sensitivity in reception of the signal light deteriorates can be evaded.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A structure for shielding a stray light in an optical waveguide module, comprising:
    an optical waveguide substrate supported in an optical waveguide module package;
    a laser diode (LD) which is mounted on said optical waveguide substrate and emits a first signal light;
    an optical waveguide which is formed on said optical waveguide substrate and propagates a part of said first signal light;
    a wavelength divisional multiplexing (WDM, hereinafter) filter which is formed on said optical waveguide substrate;
    an optical fiber which is situated on said optical waveguide substrate and transmits said part of said first signal light to an optical transmission line;
    a photodiode (PD, hereinafter) for receiving a second signal light which is propagated through said optical transmission line and transmitted through said WDM filter via said optical waveguide; and
    a metallic layer which is evaporated on a surface of said WDM filter and provided with a pin hole for transmitting said second signal light to said PD via said WDM filter,
    wherein a remaining part of said first signal light (a stray light, hereinafter) which is not optically coupled with said optical waveguide is reflected by said metallic layer so that said stray light is prevented from being coupled with said PD.

2. A structure for shielding a stray light in an optical waveguide module according to claim 1, further comprising a light-absorption layer formed on a surface of said metallic layer.

3. A structure for shielding a stray light in an optical waveguide module according to claim 2, wherein said light-absorption layer comprises chromium oxide.

4. A structure for shielding a stray light in an optical waveguide module according to claim 1, wherein:
    said WDM filter is situated near an end face of said optical waveguide substrate.

5. A structure for shielding a stray light in an optical waveguide module according to claim 4, wherein:
    said LD is situated on a side of said WDM filter.

6. A structure for shielding a stray light in an optical waveguide module, comprising:
    an optical waveguide substrate supported in an optical waveguide module package;
    a LD which is mounted on said optical waveguide substrate and emits a first signal light;
    an optical waveguide which is formed on said optical waveguide substrate and propagates a part of said first signal light;
    a WDM filter which is formed on said optical waveguide substrate;
    an optical fiber which is situated on said optical waveguide substrate and transmits said part of said first signal light to an optical transmission line;
    a photodiode for receiving a second signal light is propagated through said optical transmission line and transmitted through said WDM filter via said optical waveguide; and
    a plate which is stuck to a surface of said WDM filter, does not transmit said first and second signal lights but reflects them, and is provided with a pin hole for transmitting said second signal light to said PD via said WDM filter, wherein a remaining part of said first signal light is not optically coupled with said optical waveguide is reflected by said plate so that said stray light is prevented from being coupled with said PD.

7. The structure according to claim 1, wherein said metallic layer is oriented substantially perpendicular to said optical fiber.

8. The structure according to claim 1, wherein said part of said first signal light is optically coupled with said optical waveguide and propagated therethrough.

9. The structure according to claim 1, wherein said metallic layer reflects said stray light at a large angle of incidence.

10. The structure according to claim 1, wherein said pin hole transmits said second signal light to said PD in a substantially straight line.

11. The structure according to claim 1, wherein said WDM filter is larger than a cross-section of said optical waveguide substrate.

12. The structure according to claim 1, wherein said laser diode and said optical waveguide have a coupling ratio of no more than about 50%.

13. The structure according to claim 6, wherein said plate comprises metal.

14. A structure for shielding a stray light in an optical waveguide module, comprising:

an optical waveguide substrate supported in an optical waveguide module package;

an optical transmission element is mounted on said optical waveguide substrate and emits a first signal light;

an optical waveguide is formed on said optical waveguide substrate and propagates a part of said first signal light;

a wavelength divisional multiplexing (WDM, hereinafter) filter is formed on said optical waveguide substrate;

an optical fiber is situated on said optical waveguide substrate and transmits said part of said first signal light to an optical transmission line;

an optical reception element for receiving a second signal light is propagated through said optical transmission line and transmitted through said WDM filter via said optical waveguide; and a metallic layer evaporated on a surface of said WDM filter and provided with a pin hole for transmitting said second signal light to said optical reception element via said WDM filter, wherein a remaining part of said first signal light (a stray light, hereinafter) which is not optically coupled with said optical waveguide is reflected by said metallic layer so that said stray light is prevented from being coupled with said optical reception element.

15. The structure for shielding a stray light in an optical waveguide module according to claim 14, wherein said optical reception element comprises a photodiode.

16. The structure for shielding a stray light in an optical waveguide module according to claim 14, wherein said optical transmission element comprises a laser diode.

* * * * *